United States Patent [19]
Glassow

[11] 3,985,209
[45] Oct. 12, 1976

[54] LOCK FOR DESPIN BEARING ASSEMBLY

[75] Inventor: Franklyn A. Glassow, Hawthorne, Calif.

[73] Assignee: Hughes Aircraft Company, Culver City, Calif.

[22] Filed: June 6, 1975

[21] Appl. No.: 584,690

[52] U.S. Cl. .................................. 188/1 R; 219/201
[51] Int. Cl.² .......................................... F16D 63/00
[58] Field of Search............ 188/1 R, 79.5 B, 196 B; 219/201

[56] References Cited
UNITED STATES PATENTS

| | | | |
|---|---|---|---|
| 2,873,006 | 2/1959 | Phillips | 188/196 BA |
| 3,067,840 | 12/1962 | Werner | 188/79.5 B |
| 3,128,845 | 4/1964 | Parker | 188/1 R |

*Primary Examiner*—Duane A. Reger
*Attorney, Agent, or Firm*—W. H. MacAllister, Jr.; Martin E. Gerry

[57] ABSTRACT

The disclosure pertains to a locking arrangement for a despin bearing assembly. The lock is produced by introducing liquid gallium into an annular gap having a V-shaped cross-section between shaft and housing of the assembly. The gallium is cooled to a temperature at which it becomes solid. Numerous depressions are milled into the inside sloping surface of the V-groove in the housing and as many holes are drilled through the mating annular protrusion on the shaft. These recesses become filled with gallium and provide many shear surfaces to accept loads between shaft and housing, thus avoiding yielding of metal at the ball-race interfaces in the bearings. Compression loads are also distributed over a broad surface of gallium throughout out the V-groove.

8 Claims, 1 Drawing Figure

U.S. Patent  Oct. 12, 1976  3,985,209
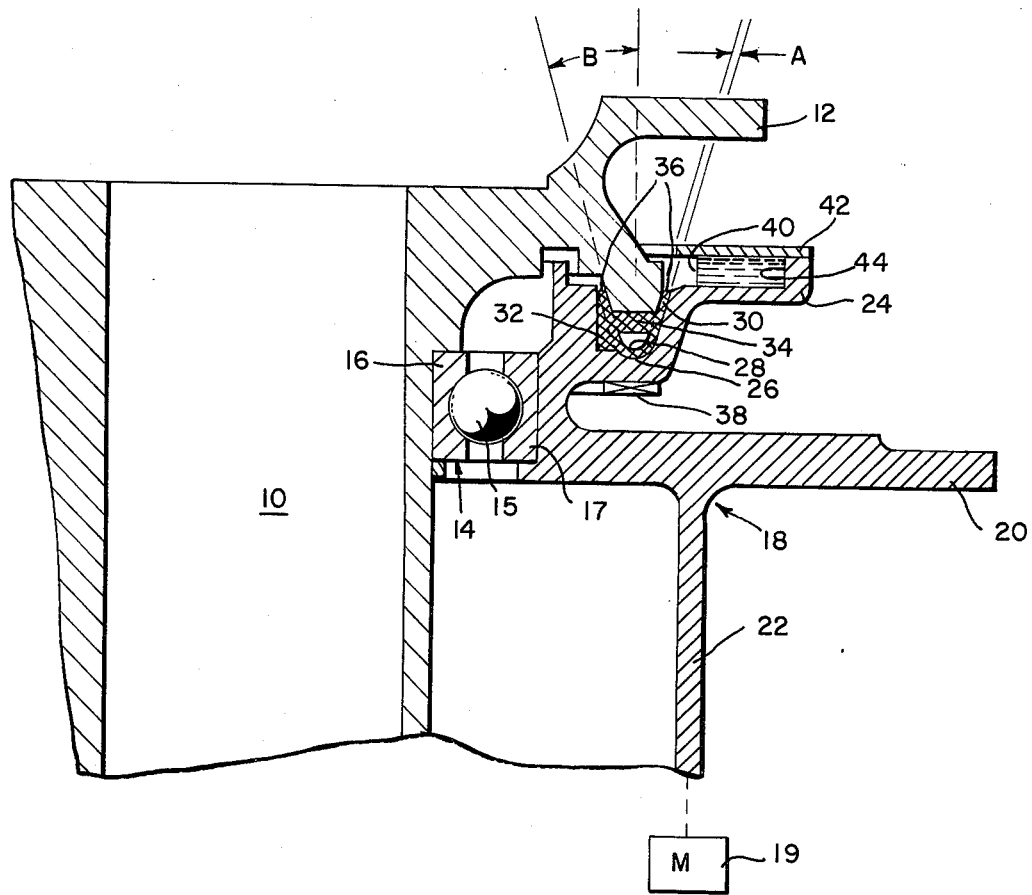

LOCK FOR DESPIN BEARING ASSEMBLY

BACKGROUND OF THE INVENTION

This invention is in the field of bearings and bearing assemblies. Particularly it is in the field of such assemblies that provide a lock between the shaft and housing of a despin bearing assembly.

No bearing assembly employing the lock function utilizing gallium as the locking medium is known in the art.

Prior lock bearing assemblies have to utilize pyrotechnic devices to disengage the lock which adds complexity and requires frequent replacement of the pyrotechnic devices as well as subjecting the assembly to possible damage.

Still a further disadvantage is that prior art assemblies do not generally provide positive mechanical locking but depend on high friction between surfaces of the locking parts.

Yet a further disadvantage of prior art assemblies is the large amount of energy required to release the lock due to shock impacts between heavy locking members.

Yet still a further disadvantage of prior art assemblies, is that the lock generally displaces the shaft with respect to the housing resulting in chatter and vibration of the assembly members.

Basically, prior art despin bearing assemblies may be described as employing multi-shoe double V-groove clamps which engage matching adjacent flanges on the shaft and housing members. The clamps are attached with redundant explosive bolts which are torqued to very high tension. Squib drivers are used to fire the explosives in the bolts causing them to separate. The loose pieces of the clamp and bolts are pulled away from the flanges with springs and are caught by a clamp catcher fitted with shock absorbing material.

In addition to the disadvantages hereinabove enumerated, the prior art assemblies per se, the clamp and clamp catcher are very heavy, generally between 12 and 19 pounds, the lock assembly consumes a large volume of space, redundant squib drivers are required to fire redundant explosive bolts integral with such assembly, and moreover coefficients of friction and wedge angles of the locking interfaces must be carefully controlled to insure disengagement of the clamp. Hence torsional loads are restrained only by frictional action between the assembly members. This requirement operates to defeat a reliable lock for despin purposes since high friction is needed to carry the torsional loads while inappositely, low friction is required to insure unclamping action.

The risks associated with such designs result in reduction of bearing life because of indiscernable brinnel marks on races and balls of bearings, the possibility of generating metallic debris inside the bearing assembly due to collision of metal parts during vibratory conditions, and possible increase in friction or bearing torque noise caused by damaged races and balls.

SUMMARY OF THE INVENTION

Accordingly, this invention has several objectives, which are:
1. to employ gallium for executing the locking function;
2. to avoid the use of pyrotechnic devices for disengaging from the lock mode;
3. to preclude the need for multiple heating assemblies and multiple command channels therefor;
4. to provide positive mechanical locking without the need for controlling friction between the several parts of the bearing;
5. to reduce the mechanical energy level over prior art assemblies for releasing the assembly from its lock mode;
6. to eliminate chatter and vibrations of bearing parts inherent in prior art assemblies;
7. to reduce the excessive weight and volume characteristic of prior art assemblies;
8. to obviate the need for controlling wedge angle interface of locking components; and
9. to increase the overall reliability of operation of the instant bearing assembly over those exhibited by prior art assemblies.

Briefly, the invention provides a lock between the shaft and housing of a despin bearing assembly which bypasses a substantial portion of launch loads around the bearings and prevents relative rotation of the despun payload with respect to the spinning rotor of the satellite. A specific purpose of the invention is to completely free the despin assembly of any friction caused by the lock after unlocking occurs.

Once the satellite has passed through launch into a zero-g condition it is spun up to a speed between 50 and 100 RPM. This produces a centrifugal force vector at the location of the gallium so that when it is melted by turning on the electric heater, all of the gallium flows out of the locking region into the outboard storage cavity. As long as the satellite remains spinning the gallium remains in the outboard cavity in the housing, leaving the bearing assembly free from any viscous friction caused by liquid gallium in the gap. Also the heater may be turned off after the few minutes necessary to melt the gallium, and the stored gallium can either remain liquid or become solid according to the local temperature. An alternate to storing the gallium is jettisoning it overboard through a tube leading from the storage cavity to an outside surface of the satellite rotor.

The metal surfaces which the gallium touches will be left unwetted by the gallium so that when unlocked the gallium leaves the locking gap cleanly.

The unique features of the instant invention are:
1. Interlocking depressions and holes which provide a "purchase" for the locking metal medium.
2. The use of centrifugal force and special geometry to rid the interface completely of gallium when an unlocked condition is desired.
3. The use of an already existing heat and command circuit in the dual function of warming the bearing and causing unlocking.
4. The use of gallium as a locking medium.

BRIEF DESCRIPTION OF THE DRAWING

The drawing consists of one FIGURE, not numbered, showing in cross-section a portion of a bearing assembly as relates specifically to this invention.

DETAILED DESCRIPTION

Referring to the FIGURE, the locking arrangement for the despin bearing assembly is shown in cross-section wherein only a portion of the bearing assembly necessary to describe the invention is illustrated.

A stationary hollow metallic shaft is shown at 10 having a flange at 12. Since only part of the shaft and flange are shown in cross-section view, it is understood that when illustrated in a full cross-section view, a "mirror image" of the other portions of the shaft and components related thereto, not shown herein, would be seen.

A bearing is shown at 14 comprising a series of balls as at 15, an inner ring at 16 and an outer ring at 17.

A rotating or spinning housing at 18, also in cross-section, in circumjacent shaft 10. Housing 18 is normally driven by motor 19 which motor is shown coupled mechanically to the housing to drive same.

Housing 18 therefore retains outer ring 17, and shaft 10 retains inner ring 18, both rings holding balls 15 for ease of rotation of housing about the shaft.

Housing 18 has flange 20 integral therewith and wall 22 to which motor 19 is mechanically coupled, as well as an extension of the housing at 24. A recess portion of the housing at 26 is generally V-shaped wherein half of the V-type recess at B forms an angle preferably of 25°.

A like V-type recess portion as at 28 of shaft 10, larger in diameter than recess 26 but having the same angle as at B, together with recess 26 form a gap 30 between recesses 26 and 28, the gap dimension being illustrated at A, preferably at about 0.03 inches.

One of many depressions in housing 18, circumjacent recess 26, is show at 32. Such depression 32, as well as apertures 34 extending through a V-shaped portion of shaft 10, and gap 30 will retain gallium in solid form to hold housing 18 to shaft 10 during launch, non-spinning mode of the housing, or so called locked mode. Under such locked mode, the gallium level will be as shown at 36.

Contrawise, when in full operation in outer space and housing 18 is being spun, the gallium level as at 40 will be in a liquid state, having been heated to such state by heater element 38 which will provide heat electrically upon command, the heat being conducted through the metallic walls of housing 18 to liquify the gallium.

A metallic plate 42 attached to the lip of extension 24 will form a storage cavity 44 for the liquid gallium, and gallium will be transferrable between gap 30 and depressions 32 and apertures 34 to cavity 44 upon heating of the gallium to provide the unlocked mode of operation and to store the gallium in liquid form in such cavity 44. It must be remembered that the liquid state of gallium will occur during operation of the vehicle in which the instant bearing is installed, when the vehicle is in outer-space where gravity is substantially zero. Therefore, cavity 44 will retain such liquid gallium in any orientation of such vehicle due to zero-gravity condition, or due to centrifugal action obtained by the spinning structure to retain the gallium in liquid form in cavity 44.

It can therefore be seen that gallium in liquid state will enable structure to be spun under one mode of operation, and be inhibited from spinning under another mode when the gallium is permitted to change into its solid state, thereby obtaining the advantages desired with the simplest possible structure.

Calculations have been made to verify results of application of various loads to the bearing to determine if the gallium will be able to withstand stresses due to such loads as indicated below, and perform the function of the bearing, as above described. Such loads and stresses are given in Table 1, as follows:

TABLE 1

| | LOADS WITHSTOOD | | |
|---|---|---|---|
| Applied Load | Description | Stresses in Shear lb/in$^2$ | Gallium Compression lb/in$^2$ |
| Bending moment = 10,000 in - lb. | Applied orthogonally to axis of shaft 10 | 3400 | 1570 |
| Torsion load = 18,400 in | Applied by twisting shaft 10 about its axis | 3400 | 3900 |
| Axial load = 25,000 lb. | Applied along axis of shaft 10 | not applicable | 3900 |
| Shear load = 6,700 lb. | Applied orthogonally to axis of shaft 10 | 3400 | 3900 |

Additional characteristics of gallium as it is germane to the invention is given in Table 2, since little has been published on the characteristics of gallium. Table 2 showing these characteristics has been obtained experimentally and recorded in the following identified document: Hughes Experimental Report No. NASA CR-72780 entitled: Experimental Liquid Metal Slip Ring Project by R. B. Clark, Hughes Aircraft Company, Culver City, California.

TABLE 2

| | GALLIUM CHARACTERISTICS | | | |
|---|---|---|---|---|
| Property | In Conventional Units, at Temperature | | In SI Units, at Temperature | |
| Density | 6.095 g/cm$^3$ | | 6.095 × 10$^3$ kgm$^{-3}$ | 303K |
| Surface Tension | 735 dynes/cm | 30°C | 0.735Nm$^{-1}$ | 303K |
| Viscosity | 0.016 poise | 100°C | 1.6 × 10$^{-3}$ Nsm$^{-2}$ | 373K |
| Vapor | 10$^{-33}$ Torr. | 80°C | 1.3 × 10$^{-31}$ Nm$^{-2}$ | 353K |
| Boiling Point | 1981°C | — | 2256K | — |
| Melting Point | 29.78°C | — | 302.93K | — |
| Resistivity | 28 × 10$^{-6}$ ohm-cm | 30°C | 28 × 10$^{-6}$ ohm-cm | — |

TABLE 2-continued

GALLIUM CHARACTERISTICS

| Property | In Conventional Units, at Temperature | | In SI Units, at Temperature | |
|---|---|---|---|---|
| Toxicity | Not Toxic | — | Not Toxic | — |
| Corrosivity | High | — | High | — |

With the foregoing in mind, it can be appreciated that the lock mode is produced by introducing liquid gallium into an annular gap having a V-shaped cross-section between shaft and housing of the assembly. The gallium is cooled to less than 80° F at which temperature it becomes solid. Numerous depressions (as many as 50) are milled into the inside sloping surface of the V-groove in the housing and as many holes are drilled through the mating annular protrusion on the shaft. These recesses become filled with gallium and provide many shear surfaces to accept loads between shaft and housing, thus avoiding yielding of metal at the ball-race interfaces in the bearings. The compressive loads are also distributed over a broad surface of gallium throughout the V-groove. The metal surfaces of which the gallium touches will be left unwetted by the gallium.

In earth testing the lock can be released by exercising the heater and reestablished by allowing the spinning rotor to come to rest and then cooling the gallium to less than 80° farenheit.

I claim:

1. A bearing assembly, comprising in combination:
   a stationary shaft;
   a housing, circumjacent to the shaft, and coupled to the shaft to permit rotation of the housing with respect to the shaft, said shaft and housing forming a chamber therebetween; and
   a metallic substance comprising gallium locking the shaft and housing to each other when the gallium is in its solid state, and releasing the housing from the shaft when the gallium is in its liquid state, so as to permit said rotation, the gallium being retained in said chamber.

2. The invention as stated in claim 1, wherein said shaft has a plurality of apertures and said housing has a plurality of depressions in portions thereof forming said chamber for providing purchase of said metallic substance.

3. The invention as stated in claim 1, wherein said housing has a storage cavity as an integral portion thereof for enabling storing of the metallic substance in its liquid state.

4. The invention as stated in claim 1, including a member attached to a portion of the housing for forming a storage cavity so as to store the metallic substance in its liquid state.

5. The invention as stated in claim 1, wherein said shaft has a plurality of apertures and said housing has a plurality of depressions in portions thereof forming said chamber for providing purchase of said gallium.

6. The invention as stated in claim 5, wherein said housing has a storage cavity as an integral portion thereof for enabling storing of said gallium in its liquid state.

7. The invention as stated in claim 5 including a plate attached to a portion of the housing for forming a storage cavity so as to store the gallium in its liquid state.

8. A method for providing locking and unlocking modes in a bearing assembly, comprising in combination the steps of:
   heating a metallic substance of gallium which is in its solid state into its liquid state, said metallic substance normally holding a rotatable housing of said assembly to a stationary shaft when the metallic substance is in the solid state; and
   spinning the housing about the stationary shaft thereby centrifugally forcing the liquified metallic substance into a storage cavity.

* * * * *